Feb. 9, 1943.   J. G. M. BULLOWA ET AL   2,310,277
OXYGEN ENRICHMENT
Filed May 23, 1939
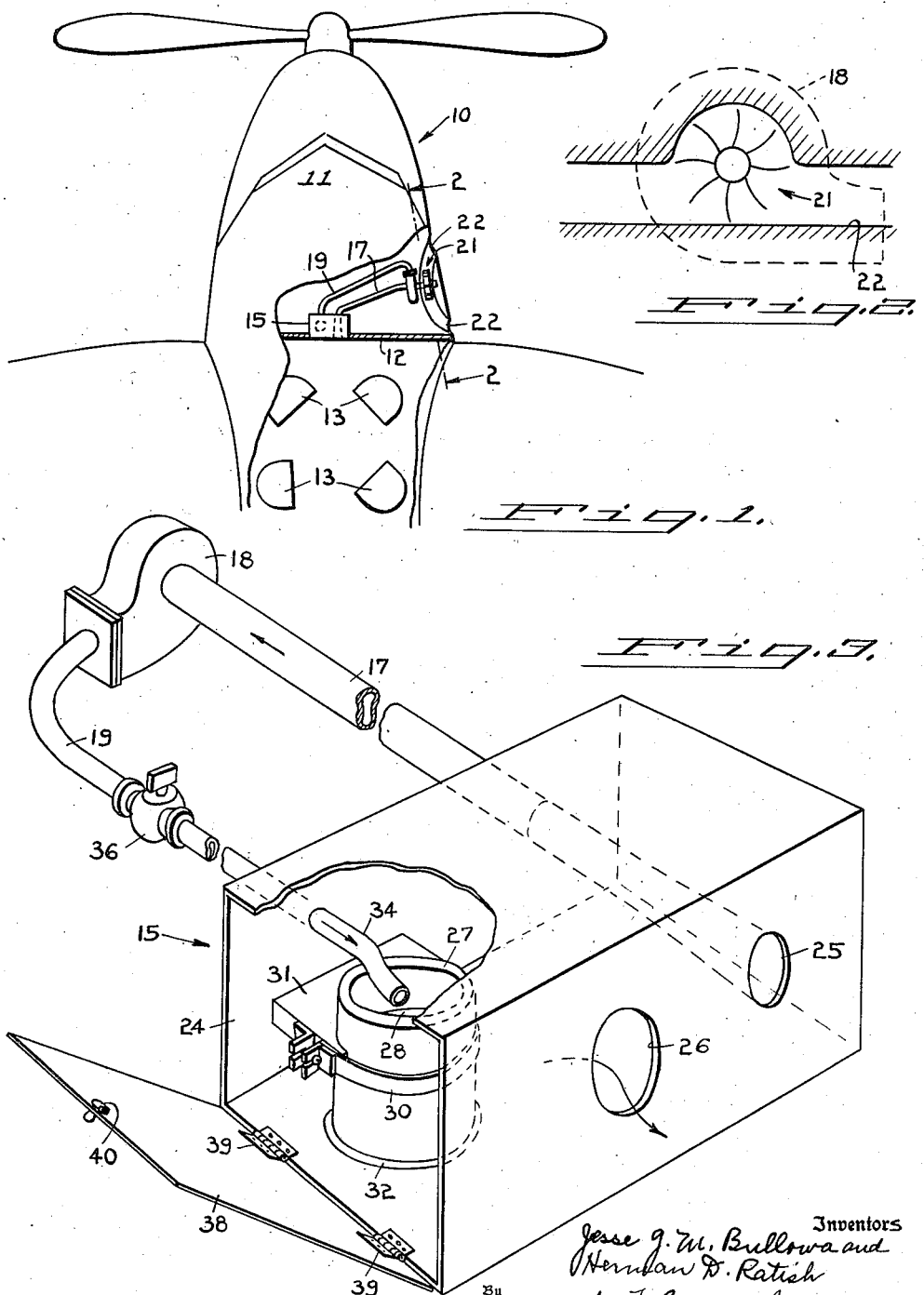
Inventors
Jesse G. M. Bullowa and
Herman D. Ratish
J. F. Brandenburg
Attorney Patented Feb. 9, 1943

2,310,277

UNITED STATES PATENT OFFICE 2,310,277

OXYGEN ENRICHMENT

Jesse G. M. Bullowa, New York, and Herman D. Ratish, Brooklyn, N. Y.

Application May 23, 1939, Serial No. 275,210

2 Claims. (Cl. 128—191)

This invention relates to enrichment with oxygen of the air in a compartment, such as the cabin of an airplane.

Instead of resorting to oxygen masks or respirators when flying at high altitudes, it is an object of this invention to provide apparatus for enriching the air of the entire airplane cabin with oxygen, and one feature of the invention obtains progressively greater enrichment of the air so that the percentage of oxygen present increases as the plane flies to higher altitudes.

Another object of the invention is to provide a recirculating system by which the air in an airplane cabin, or other enclosure, is passed and repassed through apparatus in which oxygen vapor is added to the air. Such a system makes practical the enrichment with oxygen of an entire cabin space because the amount of oxygen needed for enrichment is reduced by the recirculating.

Although intended primarily for airplanes, this invention is not limited to such use, and features of it can be applied to pits, submarines, automobile cabs, or other enclosures occupied by people and in which air is likely to become unsuitable for breathing.

Another object of the invention is to provide improved apparatus for producing oxygen vapor from liquid oxygen.

Other objects, features and advantages of the invention will appear or be pointed out as the specification proceeds.

In the accompanying drawing, forming a part hereof:

Fig. 1 is a fragmentary top plan view, partly broken away, of an airplane with its cabin equipped with air-enriching apparatus embodying this invention.

Fig. 2 is an enlarged sectional view on the line 2—2 of Fig. 1.

Fig. 3 is an enlarged perspective view of the blower and oxygen evaporator of Fig. 1.

An airplane 10 has a cabin 11 with a front wall 12 and seats 13 along both sides of a center aisle. A liquid oxygen evaporator 15 is shown attached to the front wall at one end of the aisle.

Air is drawn from the cabin through a metal conduit or pipe 17 to a blower 18. This blower discharges air through a delivery pipe 19 to the interior of the evaporator 15. The air is enriched in oxygen in the evaporator and the enriched air flows from the evaporator into the cabin. The system is therefore a recirculating one, and the rate of evaporation can be controlled to make the oxygen content of the air increase progressively if desired. Such progressive enrichment may be employed in airplanes rising to higher elevations.

The blower 18 is driven by a motor 21. In the illustrated embodiment of the invention the motor 21 is an air turbine operated by the flow of air through an air passage 22 that opens to the outside air a short distance ahead of and behind the motor 21. The air passage 22 is similar to those commonly used for ventilators in transport planes, and has its entrance located in such a position that the forward motion of the plane causes a strong current of air to flow through the passage 22. Considering the invention in its broader aspects, the air turbine is merely representative of a motor for driving the blower 18.

The evaporator proper comprises a box 24, which is preferably made of metal so that heat can flow through the walls to prevent excessive refrigeration and water condensation within the box. There are two openings 25 and 26 (Fig. 3) in the front wall of the box. The pipe 17 has its inlet end in register with the opening 25.

A cylindrical vessel 27, covered with a thick layer of heat insulating material, contains a quantity of liquid oxygen 28. The vessel 27 is held in a fixed position in the box 24 by a strap 30 which secures the vessel 27 to a block 31. The bottom of the box 24 is shown with a circular bead 32 within which the vessel 27 is initially placed before strapping it to the block 31.

The delivery pipe 19 extends through the back wall of the box 24 and has a flexible nozzle section 34 which is preferably lead or some other dead-flexible material that can be bent to a desired angle and will remain at that angle.

The flexible section 34 is bent one way or the other until its discharge end or nozzle directs the air stream at the desired angle to the vessel 27 and the liquid oxygen surface. The rate of evaporation with a given air discharge can be increased by having the air stream impinge more directly against the surface of the liquid oxygen. The volume of air delivered to the evaporator for each unit of time is controlled by a damper or valve 36 in the pipe 19.

The end of the box 24 comprises a door 38 connected to the bottom of the box 24 by hinges 39. The door 38 is held closed by a catch 40. The purpose of the door 38 is to provide access to the interior of the box 24. The door is kept closed when the evaporator is in use.

Enriched air flows out of the evaporator 15 through the opening 26, which is preferably in general alinement with the pipe 19 and vessel 27. It is not essential that the inlet and outlet openings 25 and 26 be located in the relation shown in the drawing. For enriching the air in a large cabin or other chamber, better circulation may be obtained if the inlet pipe takes air from the cabin at a point or points removed some distance from the outlet 26. If the blower is in the chamber in which the air is to be enriched, no inlet pipe is necessary, unless the chamber is large and air is to be drawn from two or more points for better circulation.

The preferred embodiment of the invention has been described, but it can be changed or modified in various ways and some features of the invention may be used without others.

We claim:

1. A recirculating oxygen enrichment system including a housing with openings in its walls, and one of said openings of substantially larger area than the other, a heat-insulated jar for containing liquid oxygen, said jar having an open top located between said openings, and a blower with a suction conduit through which air is taken from the vicinity of the housing, a discharge conduit through which air is blown into the container through the smaller of said openings, and means at the end of said discharge conduit for deflecting the air to cause said air to pass across the surface of the liquid oxygen in said jar.

2. Air enriching apparatus comprising a metal box with alined openings in opposite side walls and one of said openings of substantially larger area than the other, a hinged door at one end of the box, a heat-insulated jar for liquid oxygen, said jar having an open top and being located between said openings in a position accessible through said door, fastening means connecting said jar to the box, the fastening means being accessible through the door, a blower, a metal tube connected to the suction side of the blower, a delivery conduit from said blower positioned to deliver air through the smaller and toward the larger of the openings in the opposite sides of the box, a nozzle at the end of the delivery conduit adjustable to direct the air stream toward the liquid oxygen in said jar at different angles, and a damper in the blower delivery conduit adjustable to control the rate of air discharged from the nozzle.

JESSE G. M. BULLOWA.
HERMAN D. RATISH.